United States Patent
Fischer et al.

(10) Patent No.: US 6,833,070 B2
(45) Date of Patent: Dec. 21, 2004

(54) FUEL STRAINER ASSEMBLY

(75) Inventors: John G. Fischer, Goodrich, MI (US); Randall L. Dockery, Flushing, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/337,068

(22) Filed: Jan. 6, 2003

(65) Prior Publication Data

US 2004/0129626 A1 Jul. 8, 2004

(51) Int. Cl.$^7$ ................................................ B01D 35/02
(52) U.S. Cl. .................... 210/232; 210/416.4; 210/460; 210/463
(58) Field of Search ........................... 210/232, 416.1, 210/416.4, 460, 463

(56) References Cited

U.S. PATENT DOCUMENTS

| | | |
|---|---|---|
| 222,140 A | 12/1879 | Lindsay |
| 1,826,170 A | 10/1931 | Duggan |
| 1,890,984 A | 12/1932 | Gulick |
| 2,192,438 A | 3/1940 | Gulick |
| 2,318,220 A | 5/1943 | Haselwood |
| 2,335,096 A | 11/1943 | Zech |
| 2,448,212 A | 8/1948 | Dewey |
| 2,508,952 A | 5/1950 | Kline |
| 2,633,425 A | 3/1953 | Thompson |
| 2,788,125 A | 4/1957 | Webb |
| 4,420,396 A * | 12/1983 | Yamamoto et al. ...... 210/416.4 |
| 4,424,422 A | 1/1984 | Bell et al. |
| 4,571,481 A | 2/1986 | Leary |
| 4,626,347 A | 12/1986 | Neglio |
| 4,871,455 A * | 10/1989 | Terhune et al. ............. 210/232 |
| 4,933,079 A * | 6/1990 | Kroha ......................... 210/232 |
| 4,997,555 A | 3/1991 | Church et al. |
| 5,146,901 A | 9/1992 | Jones |
| 5,159,915 A | 11/1992 | Saito et al. |
| 5,259,953 A * | 11/1993 | Baracchi et al. ............. 210/232 |
| 5,293,899 A | 3/1994 | Kwon |
| 5,378,358 A | 1/1995 | Park |
| 5,547,568 A | 8/1996 | Sasaki |
| 5,607,578 A * | 3/1997 | Ohkouchi et al. .......... 210/172 |
| 5,665,229 A * | 9/1997 | Fitzpatrick et al. ......... 210/232 |
| 5,716,522 A | 2/1998 | Chilton et al. |
| 5,993,675 A * | 11/1999 | Hagerty ...................... 210/799 |
| 6,170,470 B1 | 1/2001 | Clarkson et al. |
| 6,176,133 B1 | 1/2001 | Hutter et al. |
| 6,179,577 B1 | 1/2001 | Meyer |
| 6,193,885 B1 | 2/2001 | Campbell |
| 6,220,454 B1 * | 4/2001 | Chilton ....................... 210/483 |
| 6,361,691 B1 | 3/2002 | Dockery et al. |
| 6,464,872 B1 * | 10/2002 | Honda ...................... 210/416.4 |
| 6,471,863 B2 * | 10/2002 | Kojima .................... 210/416.4 |
| 6,638,423 B2 | 10/2003 | Dockery |

FOREIGN PATENT DOCUMENTS

| | | |
|---|---|---|
| EP | 0 743 445 A1 | 11/1996 |
| EP | 0 743 445 B 1 | 9/1998 |
| RU | 2177071 | 12/2001 |

* cited by examiner

Primary Examiner—Fred G. Prince
(74) Attorney, Agent, or Firm—Jimmy L. Funke

(57) ABSTRACT

A fuel strainer assembly includes a filtration member and an inlet connector connected to the filtration member for connection to an inlet of a fuel pump. The fuel strainer assembly also includes a locking mechanism operatively supported by the inlet connector to operatively engage a shell of the fuel pump to secure the inlet connector to the fuel pump.

20 Claims, 4 Drawing Sheets

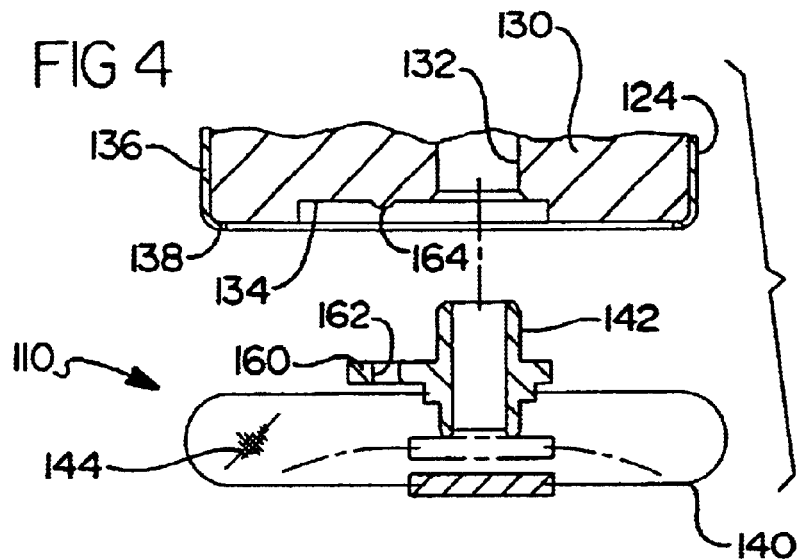
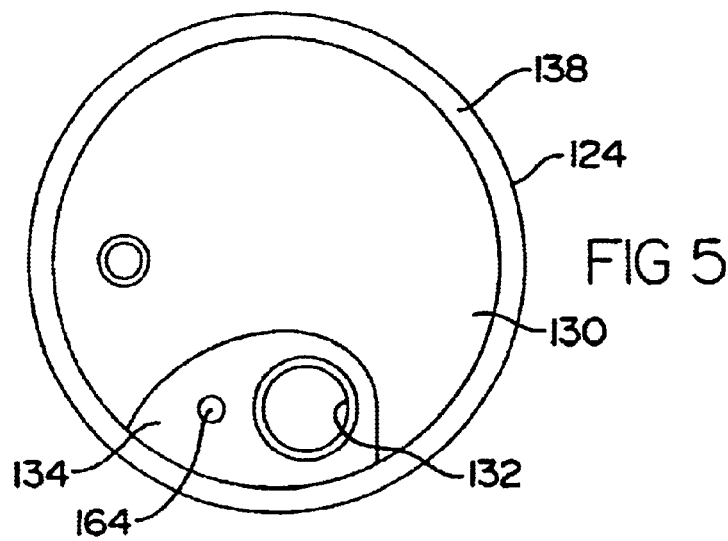
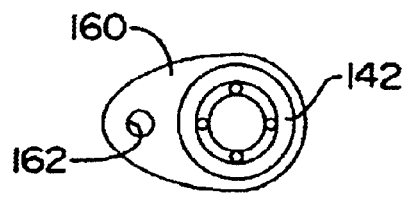

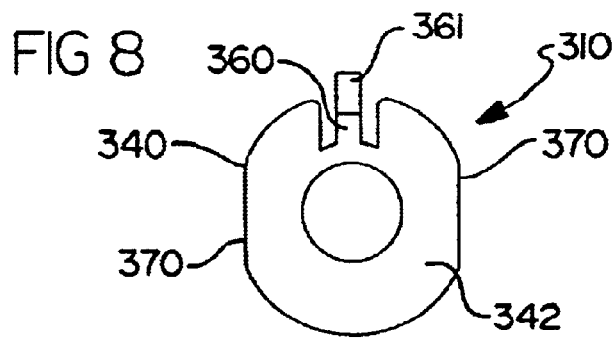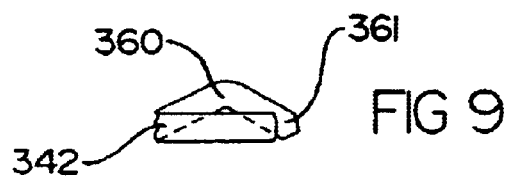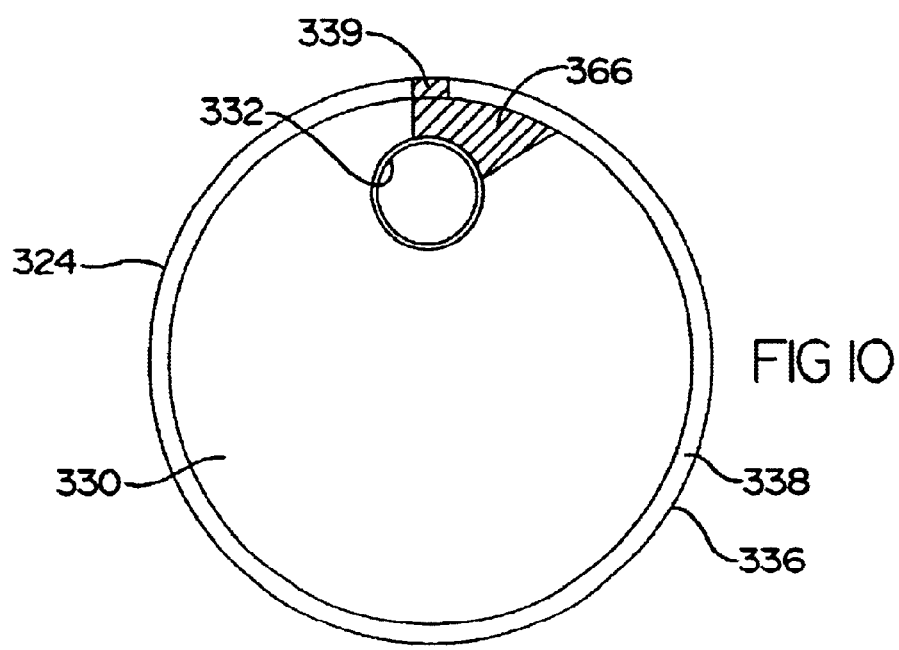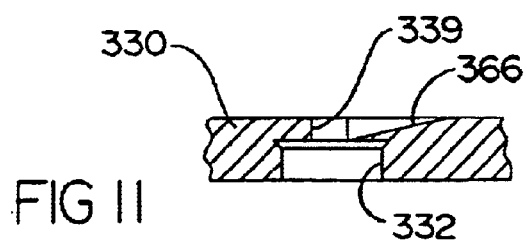

FUEL STRAINER ASSEMBLY

TECHNICAL FIELD

The present invention relates generally to fuel tanks for vehicles and, more particularly, to a fuel strainer assembly for a fuel tank of a vehicle.

BACKGROUND OF THE INVENTION

It is known to provide a fuel tank for a fuel system in a vehicle to hold fuel to be used by an engine of the vehicle. It is also known to provide an electric fuel pump in the fuel tank to pump fuel from the fuel tank to the engine. In-tank electric fuel pumps typically require a filter to remove particular contaminants from the fuel prior to entering the fuel pump. This pre-filtration is commonly accomplished by connecting a fuel strainer assembly to an inlet of the fuel pump. This connection interface must secure the mating parts for the life of the fuel pump.

One known connection is a press fit connection between an outside diameter of a snout extending from an inlet body of the fuel pump and an inside diameter of a connector body integral to the fuel strainer assembly. Another known connection secures the fuel strainer assembly to the inlet of the fuel pump using a post extending from the inlet body and a pal nut fastener to retain the fuel strainer assembly. However, both of these connections require a feature to be added to the inlet body (i.e., a snout or a post) of the fuel pump. As a result, these features add unnecessary complexity to the inlet body of the fuel pump and are not production feasible for a manufacturing process (i.e. compression molding).

Therefore, it is desirable to provide a new fuel strainer assembly for a fuel tank in a vehicle that has a connection to attach a fuel strainer to an inlet of the fuel pump. It is also desirable to provide a fuel strainer assembly for a fuel tank in a vehicle that eliminates additional parts for connection of the fuel strainer to the inlet of the fuel pump. It is further desirable to provide a fuel strainer assembly for a fuel tank in a vehicle that provides orientation and anti-rotation of the fuel strainer relative to the inlet of the fuel pump.

SUMMARY OF THE INVENTION

It is, therefore, one object of the present invention to provide a fuel strainer assembly for a fuel tank in a vehicle.

It is another object of the present invention to provide a fuel strainer assembly for a fuel tank in a vehicle that connects a fuel strainer to an inlet of a fuel pump without adding additional parts.

To achieve the foregoing objects, the present invention is a fuel strainer assembly including a filtration member and an inlet connector connected to the filtration member for connection to an inlet of a fuel pump. The fuel strainer assembly also includes a locking mechanism operatively supported by the inlet connector to operatively engage a shell of the fuel pump to secure the inlet connector to the fuel pump.

One advantage of the present invention is that a new fuel strainer assembly is provided for a fuel tank in a vehicle. Another advantage of the present invention is that the fuel strainer assembly allows contaminant wear resistant materials to be compression molded. Yet another advantage of the present invention is that the fuel strainer assembly allows a fuel strainer to be attached to a fuel pump without the addition of extra features to an inlet body of the fuel pump and eliminates additional parts like a pal nut or retainer. Still another advantage of the present invention is that the fuel strainer assembly provides a mechanism for radial orientation and anti-rotation because the location of the fuel strainer is controlled by the components and not the assembly tooling.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 4 is a fragmentary elevational view of another embodiment, according to the present invention, of the fuel strainer assembly of FIG. 1.

FIG. 5 is a plan view of a fuel pump for the fuel strainer assembly of FIG. 4.

FIG. 6 is a plan view of a portion of the fuel strainer assembly of FIG. 4.

FIG. 8 is a plan view of still another embodiment, according to the present invention, of the fuel strainer assembly of FIG. 1.

FIG. 9 is a partial elevational view of a portion of the fuel strainer assembly of FIG. 8.

FIG. 10 is a plan view of a fuel pump for the fuel strainer assembly of FIG. 8.

FIG. 11 is a fragmentary elevational view of a portion of the fuel pump of FIG. 10.

DESCRIPTION OF THE PREFERRED EMBODIMENT

Figure 1:
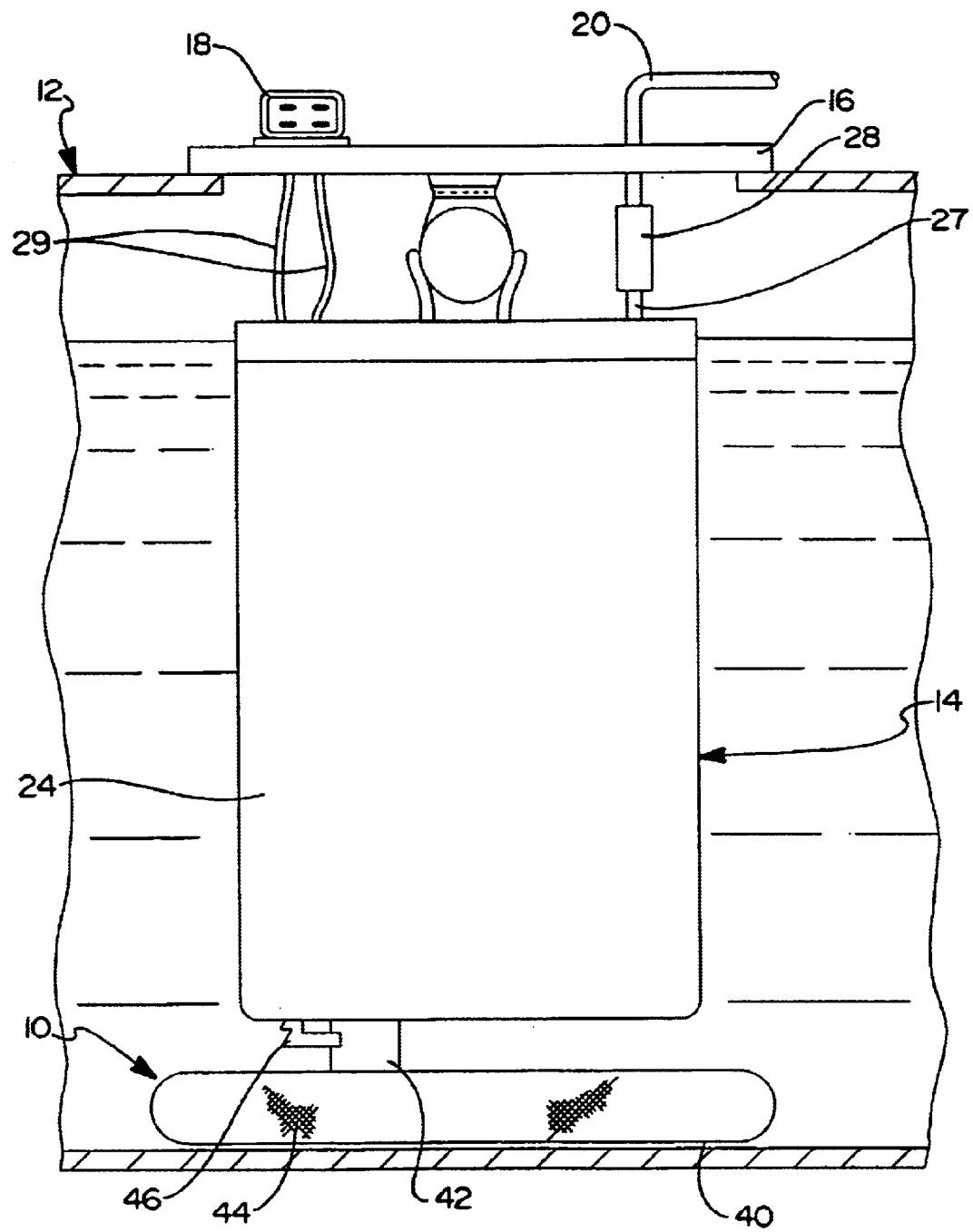
FIG. 1 is a fragmentary elevational view of a fuel strainer assembly, according to the present invention, illustrated in operational relationship with a fuel tank.
Figure 2:
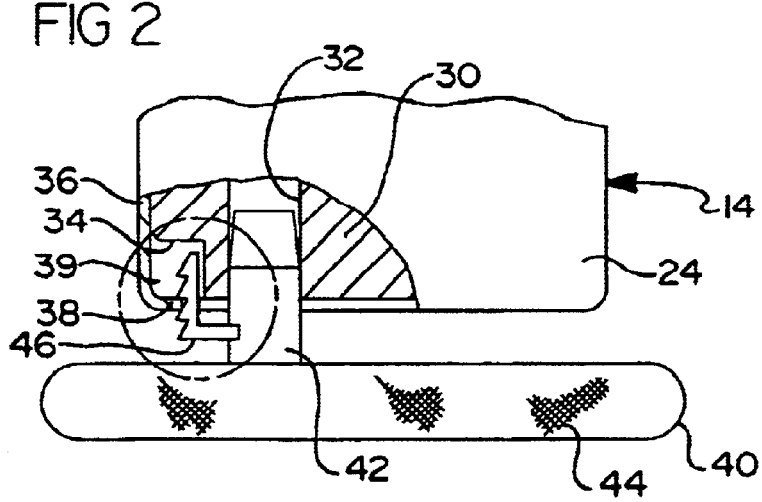
FIG. 2 is a fragmentary elevational view of the fuel strainer assembly of FIG. 1.

Referring to the drawings and in particular FIGS. 1 and 2, one embodiment of a fuel strainer assembly 10, according to the present invention, is shown for a fuel tank, generally indicated at 12, in a vehicle (not shown). The fuel tank 12 includes a fuel-sending unit 14 disposed therein having a removable cover 16 sealed to the top of the fuel tank 12 with an electrical connector 18 and a fuel line connector 20. The fuel-sending unit 14 also includes an electrical fuel pump 24. The fuel-sending unit 14 also includes a fuel tube 27 connected to the fuel pump 24 and connected to the fuel line connector 20 by a coupler 28. The fuel strainer assembly 10 is connected to the fuel pump 24 and is positioned close to a bottom of the fuel tank 12. The fuel tank 12 is formed of a metal material or plastic material. It should be appreciated that the fuel strainer assembly 10 may be connected to a fuel module (not shown). It should also be appreciated that electrical wires 29 interconnect the electrical connector 18 and the fuel pump 24.

Figure 3:
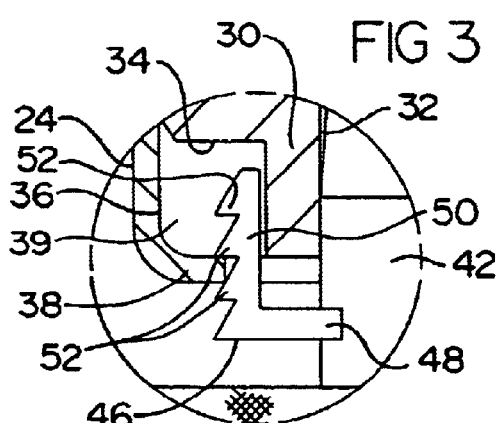
FIG. 3 is an enlarged view of a portion of the fuel strainer assembly in circle 3 of FIG. 2.

Referring to FIGS. 2 and 3, the electrical fuel pump 24 has an inlet body 30 with an inlet 32 at a bottom thereof. The inlet 32 is a counter bore extending axially into the inlet body 30. The inlet body 30 also has a recessed slot 34 spaced radially from and adjacent to the inlet 32 for a function to be described. The fuel pump 24 also has an outer shell 36 that contains the inlet body 30 and secures the inlet body 30 in the axial direction using a rolled lip 38. It should be appreciated that the lip 38 of the outer shell 36 overlaps a portion of the recessed slot 34 such that an undercut 39 is formed. It should also be appreciated that the inlet body 30 may be formed by a conventional process such as a compression molding process.

Referring to FIGS. 1 through 3, the fuel strainer assembly 10 includes a fuel strainer 40 extending longitudinally. The fuel strainer 40 is generally rectangular in shape, but may be any suitable shape. The fuel strainer 40 has an inlet connector 42 that fits into the inlet 32 of the inlet body 30 of the fuel pump 24. The inlet connector 42 is a tubular member made of a rigid material such as metal or plastic, preferably nylon or acetal. The fuel strainer 40 includes a filtration member 44 connected to the connector 42. The filtration member 44 is fabricated from a mesh or fibrous filtering material made of a plastic material, preferably nylon, to allow fuel to pass therethrough to the fuel pump 24, but prevent certain contaminants from passing therethrough to the fuel pump 24. The filtration member 44 has a particle retention rating of approximately thirty (30) microns to approximately eighty (80) microns. The filtration member 44 may be one or more layers connected to the connector 32 by conventional means.

The fuel strainer assembly 10 also includes a locking mechanism such as a lever arm 46 to lock the inlet connector 32 to the fuel pump 24. The lever arm 46 is generally "L" shaped and has a first arm 48 extending radially from the inlet connector 42 and a second arm 50 extending axially or generally perpendicular to the first arm 48. The lever arm 46 also has a serrated ratchet mechanism formed by a plurality of teeth 52 along the second arm 50. The lever arm 46 is made of a plastic material and preferably molded to the inlet connector 42. It should be appreciated that the lever arm 46 and inlet connector 42 are integral, unitary, and formed as one-piece. It should also be appreciated that the second arm 50 flexes radially relative to the first arm 48.

To assemble the fuel strainer assembly 10 to the fuel pump 24, the inlet connector 42 is disposed axially in the inlet 32 of the inlet body 30. During insertion of the inlet connector 42 into the inlet 32 of the inlet body 30 of the fuel pump 24, the teeth 52 of the lever arm 46 engage the lip 38 of the outer shell 36, causing the second arm 50 to flex. The lever arm 46 locks onto the lip 38 of the outer shell 36, preventing the fuel strainer 40 from disengaging from the fuel pump 24. As the insertion depth increases, the second arm 50 is disposed in the slot 34 and the teeth 52 continue to lock onto the lip 38 of the outer shell 36, preventing the fuel strainer 40 from disengaging the fuel pump 24. It should be appreciated that fuel strainer 40 is retained with an axial insertion or push-on force (no rotation). It should also be appreciated that the lever arm 46 and slot 34 reliably secure the fuel strainer 40 to the inlet body 30 and the slot 34 locates the radial position of the fuel strainer 40.

Referring to FIGS. 4 through 6, another embodiment, according to the present invention, of the fuel strainer assembly 10 is shown. Like parts of the fuel strainer assembly 10 and fuel pump 24 have like reference numerals increased by one hundred (100). In this embodiment, the fuel strainer assembly 110 includes the fuel strainer 140 having the inlet connector 142 and filtration member 144. The fuel strainer assembly 110 eliminates the lever arm and includes a locking arm 160 extending radially from the inlet connector 142. The locking arm 160 has an indentation or aperture 162 therein. It should be appreciated that the locking arm 160 functions to engage the lip 138 of the outer shell 136.

Additionally, in this embodiment, the fuel pump 124 includes the inlet body 130 having the inlet 132 and the outer shell 136 having the lip 138. The inlet body 130 also includes a recessed slot 134 extending radially from the inlet 132. The inlet body 130 includes a projection 164 such as a bump extending into the recessed slot 134 for a function to be described. The inlet body 130 is preferably made of a powered metal material.

To assemble the fuel strainer assembly 110 to the fuel pump 124, the inlet connector 142 is disposed axially in the inlet 132 of the inlet body 130. During installation of the inlet connector 142 into the inlet 132 of the inlet body 130 of the fuel pump 124, the fuel strainer 140 is rotated so that the locking arm 160 is trapped under the lip 138 of the outer shell 136. The locking arm 160 is secured from rotating out of position by the projection 164 that traps the indentation 162 on the locking arm 160. It should be appreciated that the locking arm 160 reliably secures the fuel strainer 140 to the inlet body 130 and radially locates the fuel strainer 140 using an axial and rotational installation force.

Figure 7:
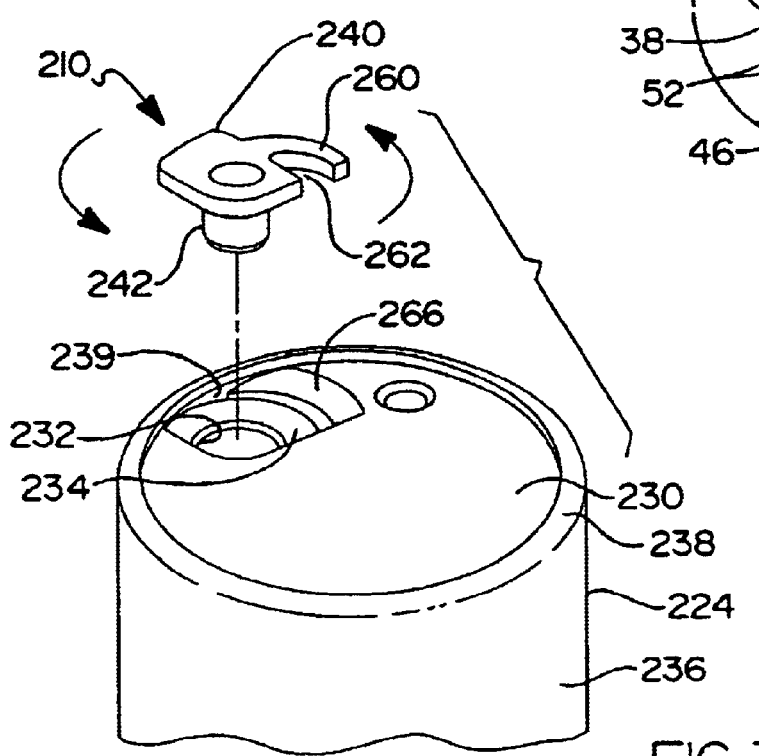
FIG. 7 is a perspective view of yet another embodiment, according to the present invention, of the fuel strainer assembly of FIG. 1.

Referring to FIG. 7, yet another embodiment, according to the present invention, of the fuel strainer assembly 10 is shown. Like parts of the fuel strainer assembly 10 and fuel pump 24 have like reference numerals increased by two hundred (200). In this embodiment, the fuel strainer assembly 210 includes the fuel strainer 240 having the inlet connector 242 and the filtration member (not shown). The fuel strainer assembly 210 eliminates the lever arm and includes a locking arm 260 extending radially from the inlet connector 242. The locking arm 260 is generally arcuate in shape to form an indentation or slot 262 between the locking arm 260 and the inlet connector 242. It should be appreciated that the locking arm 260 functions to engage the lip 238 of the outer shell 236.

Additionally, in this embodiment, the fuel pump 224 includes the inlet body 230 having the inlet 232 and the outer shell 236 having the lip 238. The inlet body 230 also includes a recessed slot 234 extending radially from the inlet 232. The inlet body 230 includes a ramp surface 266 that forms the undercut 239 under the lip 238 of the outer shell 236. The inlet body 230 is preferably made of a powered metal material.

To assemble the fuel strainer assembly 210 to the fuel pump 224, the inlet connector 242 is disposed axially in the inlet 232 of the inlet body 230. During installation of the inlet connector 242 into the inlet 232 of the inlet body 230 of the fuel pump 224, the inlet connector 242 of the fuel strainer 240 is rotated so that the locking arm 260 is trapped under the lip 238 of the outer shell 236. The locking arm 260 is secured from rotating out of position by rotating the inlet connector 242 of the fuel strainer until the locking arm 260 is engaged perpendicular to the inside diameter of the outer shell 236. It should be appreciated that the locking arm 260 reliably secures the fuel strainer 240 to the inlet body 230 and radially locates the fuel strainer 240 using an axial and rotational installation force.

Referring to FIGS. 8 through 11, still another embodiment, according to the present invention, of the fuel strainer assembly 10 is shown. Like parts of the fuel strainer assembly 10 and fuel pump 24 have like reference numerals increased by three hundred (300). In this embodiment, the fuel strainer assembly 310 includes the fuel strainer 340 having the inlet connector 342 and the filtration member (not shown). The fuel strainer assembly 310 eliminates the lever arm and includes a locking arm 360 extending radially from the inlet connector 342. The locking arm 360 has a tab 361 to form a generally inverted "V" shape to flex for a function to be described. The inlet connector 342 may also have a pair of opposed flats 370 to allow twisting of the inlet connector 342. It should be appreciated that the locking arm 360 functions to engage the lip 338 of the outer shell 336.

Additionally, in this embodiment, the fuel pump 324 includes the inlet body 330 having the inlet 332 and the outer shell 336 having the lip 338. The inlet body 330 also includes a ramp surface 366 that forms a pocket region or undercut 339 under the lip 338 of the outer shell 336. The inlet body 330 is preferably made of a powered metal material.

To assemble the fuel strainer assembly 310 to the fuel pump 324, the inlet connector 342 is disposed axially in the inlet 332 of the inlet body 330. During installation of the inlet connector 342 into the inlet 332 of the inlet body 330 of the fuel pump 324, the inlet connector 342 of the fuel strainer 340 is rotated so that the locking arm 360 is trapped under the lip 338 of the outer shell 336. The locking arm 360 is secured from rotating out of position by the undercut 339 that traps the tab 361 on the locking arm 360. It should be appreciated that the locking arm 360 reliably secures the fuel strainer 340 to the inlet body 330 and radially locates the fuel strainer 340 using an axial and rotational installation force.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel strainer assembly comprising:
   a filtration member;
   an inlet connector connected to said filtration member for connection to an inlet of a fuel pump; and
   a locking mechanism operatively supported by said inlet connector to operatively engage a shell of the fuel pump to secure said inlet connector to the fuel pump.

2. A fuel strainer assembly as set forth in claim 1 wherein said locking mechanism comprises a lever arm having a plurality of teeth.

3. A fuel strainer assembly as set forth in claim 2 wherein said lever arm has a first arm extending radially from said inlet connector and a second arm extending from said first arm and axially relative to said inlet connector, said teeth being disposed on said second arm.

4. A fuel strainer assembly as set forth in claim 1 wherein said locking mechanism comprises a locking arm extending radially from said inlet connector.

5. A fuel strainer assembly as set forth in claim 4 wherein said locking arm has an indentation therein to cooperate with a projection on an inlet body of the fuel pump.

6. A fuel strainer assembly as set forth in claim 4 wherein said locking arm has a generally arcuate shape to form a slot between said locking arm and said inlet connector.

7. A fuel strainer assembly as set forth in claim 4 wherein said locking arm has a tab for being received in a notch of the fuel pump.

8. A fuel strainer assembly as set forth in claim 1 wherein said inlet connector is made of either one of a metal material and a plastic material.

9. A fuel strainer assembly comprising:
   a fuel pump having an inlet body with an inlet therein and an outer shell with a lip overlapping said inlet body;
   a fuel strainer for connection to said inlet of said fuel pump; and
   said fuel strainer having an inlet connector disposed in said inlet of said fuel pump and a locking mechanism operatively supported by said inlet connector to engage said outer shell of said fuel pump to secure said inlet connector to said fuel pump.

10. A fuel strainer assembly as set forth in claim 9 wherein said inlet body has an undercut between said outer shell and said inlet body.

11. A fuel strainer assembly as set forth in claim 10 wherein said inlet body has a ramped surface between said inlet and said undercut.

12. A fuel strainer assembly as set forth in claim 10 wherein said locking mechanism comprises a lever arm having a plurality of teeth.

13. A fuel strainer assembly as set forth in claim 12 wherein said lever arm has a first arm extending radially from said inlet connector and a second arm extending from said first arm and axially relative to said inlet connector, said teeth being disposed on said second arm.

14. A fuel strainer assembly as set forth in claim 13 wherein a portion of said second arm is disposed in said undercut.

15. A fuel strainer assembly as set forth in claim 10 wherein said locking mechanism comprises a locking arm extending radially from said inlet connector.

16. A fuel strainer assembly as set forth in claim 15 wherein said inlet body has a projection extending axially.

17. A fuel strainer assembly as set forth in claim 16 wherein said locking arm has an indentation therein to cooperate with said projection.

18. A fuel strainer assembly as set forth in claim 11 wherein said locking arm has a generally arcuate shape to form a slot between said locking arm and said inlet connector.

19. A fuel strainer assembly as set forth in claim 11 wherein said locking arm has a tab for being received in said undercut.

20. A fuel tank assembly for a vehicle comprising:
   a fuel tank;
   a fuel pump disposed in said fuel tank and having an inlet body with an inlet therein and an outer shell with a lip overlapping said inlet body;
   a fuel strainer assembly operatively connected to said inlet; and
   said fuel strainer assembly comprising a filtration member, an inlet connector connected to said filtration member and being disposed in said inlet of said fuel pump, and a locking mechanism operatively supported by said inlet connector to engage said outer shell of said fuel pump to secure said inlet connector to said fuel pump.

* * * * *